(12) United States Patent
Martinez et al.

(10) Patent No.: US 11,593,837 B2
(45) Date of Patent: Feb. 28, 2023

(54) ADVERTISEMENT ENGAGEMENT MEASUREMENT

(71) Applicant: Aerial Technologies Inc., Montreal (CA)

(72) Inventors: Michel Allegue Martinez, Terrebonne (CA); Negar Ghourchian, Montreal (CA); David Grant, Santa Rosa Valley, CA (US); Francois Morel, Kirkland (CA); Pascal Paradis-Theberge, Montreal (CA)

(73) Assignee: Aerial Technologies Inc., Montreal (CA)

( * ) Notice: Subject to any disclaimer, the term of this patent is extended or adjusted under 35 U.S.C. 154(b) by 103 days.

(21) Appl. No.: 16/795,198

(22) Filed: Feb. 19, 2020

(65) Prior Publication Data

US 2020/0302478 A1 Sep. 24, 2020

Related U.S. Application Data

(60) Provisional application No. 62/809,011, filed on Feb. 22, 2019, provisional application No. 62/809,336, filed on Feb. 22, 2019.

(51) Int. Cl.
*G06Q 30/02* (2012.01)
*G06Q 30/0251* (2023.01)
(Continued)

(52) U.S. Cl.
CPC ..... *G06Q 30/0255* (2013.01); *G06F 16/2379* (2019.01); *G06Q 30/0205* (2013.01);
(Continued)

(58) Field of Classification Search
CPC ........... G06Q 30/0255; G06Q 30/0205; G06Q 50/01; G06F 16/2379; H04W 24/08
See application file for complete search history.

(56) References Cited

U.S. PATENT DOCUMENTS

| | | | |
|---|---|---|---|
| 8,073,441 B1 | 12/2011 | Unger et al. | |
| 8,461,988 B2 | 6/2013 | Tran | |

(Continued)

FOREIGN PATENT DOCUMENTS

| | | |
|---|---|---|
| CA | 3044480 | 5/2018 |
| CN | 105828289 | 8/2016 |

(Continued)

OTHER PUBLICATIONS

Electronic Frog Eye: Counting Crowd Using WiFi; Jul. 8, 2014; Xi et al. (Year: 2014).*

(Continued)

*Primary Examiner* — Deirdre D Hatcher
(74) *Attorney, Agent, or Firm* — Polsinelli LLP

(57) ABSTRACT

Systems, and methods for selecting advertisements based on party size and/or engagement are provided. An Internet-connected media display device may be detected as displaying media. An up-to-date party size in a monitored space may be determined based on frequency response data by a wireless access point located close to the space. An up-to-date engagement level may also be determined with respect to each individual in the space based on frequency response data by the wireless access point. An advertisement database may be filtered for a qualifying advertisement based on the identified party size and engagement levels.

15 Claims, 5 Drawing Sheets

(51) Int. Cl.
  *G06Q 50/00*       (2012.01)
  *H04W 24/08*       (2009.01)
  *G06F 16/23*       (2019.01)
  *H04N 21/81*       (2011.01)
  *G06Q 30/0204*     (2023.01)

(52) U.S. Cl.
  CPC .......... *G06Q 50/01* (2013.01); *H04N 21/812* (2013.01); *H04W 24/08* (2013.01)

(56) References Cited

U.S. PATENT DOCUMENTS

| | | |
|---|---|---|
| 9,219,790 B1 | 12/2015 | Filev et al. |
| 9,414,115 B1 | 8/2016 | Mao et al. |
| 9,703,892 B2 | 7/2017 | Ramer et al. |
| 9,854,292 B1 | 12/2017 | Matthews et al. |
| 9,867,548 B2 | 1/2018 | Le et al. |
| 9,985,846 B1 | 5/2018 | Roman et al. |
| 10,045,191 B2 | 8/2018 | Nguyen et al. |
| 10,374,646 B1* | 8/2019 | Fletcher ............... H04B 17/20 |
| 10,419,880 B1* | 9/2019 | Long ..................... H04W 4/80 |
| 10,818,384 B1 | 10/2020 | Peterson et al. |
| 10,999,705 B2 | 5/2021 | Martinez |
| 11,017,688 B1 | 5/2021 | Arazi |
| 11,039,278 B1 | 6/2021 | Carreiro et al. |
| 11,082,109 B2 | 8/2021 | Martinez |
| 11,218,769 B2 | 1/2022 | Martinez |
| 11,448,726 B2 | 9/2022 | Martinez |
| 11,523,253 B2 | 12/2022 | Martinez |
| 2002/0188668 A1 | 12/2002 | Jeffery et al. |
| 2006/0224938 A1 | 10/2006 | Fikes et al. |
| 2007/0024580 A1 | 2/2007 | Sands et al. |
| 2007/0266395 A1 | 11/2007 | Lee et al. |
| 2008/0262909 A1* | 10/2008 | Li ........................ G06Q 30/02 705/14.49 |
| 2010/0242063 A1 | 9/2010 | Slaney et al. |
| 2011/0029277 A1 | 2/2011 | Chowdhary et al. |
| 2011/0117924 A1 | 5/2011 | Brunner et al. |
| 2011/0129047 A1 | 6/2011 | Mashino et al. |
| 2011/0258039 A1 | 10/2011 | Patwa et al. |
| 2012/0053472 A1 | 3/2012 | Tran |
| 2012/0135733 A1 | 5/2012 | Cormier et al. |
| 2012/0289147 A1 | 11/2012 | Raleigh et al. |
| 2012/0324494 A1 | 12/2012 | Burger et al. |
| 2013/0014136 A1 | 1/2013 | Bhatia et al. |
| 2013/0028443 A1 | 1/2013 | Pance et al. |
| 2013/0053990 A1 | 2/2013 | Ackland |
| 2013/0102256 A1 | 4/2013 | Cendrillon et al. |
| 2013/0115974 A1 | 5/2013 | Lee et al. |
| 2013/0326554 A1 | 12/2013 | Shkedi |
| 2014/0033240 A1 | 1/2014 | Card et al. |
| 2014/0181100 A1 | 6/2014 | Ramer et al. |
| 2014/0223467 A1 | 8/2014 | Hayton et al. |
| 2014/0278389 A1 | 9/2014 | Zurek et al. |
| 2014/0358012 A1 | 12/2014 | Richards et al. |
| 2015/0026708 A1 | 1/2015 | Ahmed et al. |
| 2015/0050923 A1 | 2/2015 | Tu et al. |
| 2015/0092747 A1 | 4/2015 | Ganesan |
| 2015/0110471 A1 | 4/2015 | Zheng |
| 2015/0113556 A1 | 4/2015 | Weast et al. |
| 2015/0121428 A1 | 4/2015 | Nguyen et al. |
| 2015/0365787 A1 | 12/2015 | Farrell |
| 2016/0057472 A1 | 2/2016 | Gupta et al. |
| 2016/0105700 A1 | 4/2016 | Collins et al. |
| 2016/0127766 A1 | 5/2016 | Luk et al. |
| 2016/0174185 A1 | 6/2016 | Ramakrishnan et al. |
| 2016/0253710 A1 | 9/2016 | Publicover et al. |
| 2016/0277529 A1 | 9/2016 | Chen et al. |
| 2016/0315682 A1* | 10/2016 | Liu ........................ H04W 4/02 |
| 2016/0337701 A1* | 11/2016 | Khare ................... H04N 21/812 |
| 2016/0344779 A1* | 11/2016 | Jain ...................... H04L 67/26 |
| 2017/0032191 A1 | 2/2017 | Ackland |
| 2017/0068790 A1 | 3/2017 | Fuerst |
| 2017/0135635 A1 | 5/2017 | Bostick et al. |
| 2017/0160089 A1 | 6/2017 | Jang et al. |
| 2017/0315711 A1 | 11/2017 | Adams |
| 2017/0332192 A1 | 11/2017 | Edge |
| 2017/0354349 A1 | 12/2017 | Mohapatra et al. |
| 2017/0366955 A1 | 12/2017 | Edge |
| 2018/0008207 A1 | 1/2018 | Sarkela et al. |
| 2018/0035072 A1 | 2/2018 | Asarikuniyil et al. |
| 2018/0091952 A1* | 3/2018 | Sant ...................... H04W 4/023 |
| 2018/0181094 A1 | 6/2018 | Funk et al. |
| 2018/0184165 A1 | 6/2018 | Maughan et al. |
| 2018/0330406 A1 | 11/2018 | Deluca et al. |
| 2019/0051342 A1 | 2/2019 | Wootton et al. |
| 2019/0174170 A1 | 6/2019 | Chen |
| 2019/0178980 A1 | 6/2019 | Zhang et al. |
| 2019/0188756 A1 | 6/2019 | Bradley et al. |
| 2019/0246371 A1 | 8/2019 | Hwang et al. |
| 2019/0306023 A1 | 10/2019 | Vasseur et al. |
| 2020/0036592 A1 | 1/2020 | Kholaif |
| 2020/0090022 A1 | 3/2020 | Ma et al. |
| 2020/0112939 A1 | 4/2020 | Scharf et al. |
| 2020/0120384 A1 | 4/2020 | Armaly |
| 2020/0133383 A1 | 4/2020 | Ahlstrom et al. |
| 2020/0186321 A1 | 6/2020 | Hwang et al. |
| 2020/0226388 A1 | 7/2020 | Ghessassi |
| 2020/0265700 A1 | 8/2020 | Bergman et al. |
| 2020/0292572 A1 | 9/2020 | Bateni |
| 2020/0296463 A1 | 9/2020 | Martinez |
| 2020/0303046 A1 | 9/2020 | Martinez |
| 2020/0327430 A1 | 10/2020 | Martinez |
| 2020/0328793 A1 | 10/2020 | Martinez |
| 2020/0329343 A1 | 10/2020 | Martinez |
| 2020/0383119 A1 | 12/2020 | Sun et al. |
| 2020/0397365 A1 | 12/2020 | Zhang et al. |
| 2021/0063537 A1 | 3/2021 | Martinez |
| 2021/0120370 A1 | 4/2021 | Martinez |
| 2021/0352441 A1 | 11/2021 | Liu |
| 2022/0060234 A1 | 2/2022 | Martinez |
| 2022/0070633 A1 | 3/2022 | Ghoshal |
| 2022/0167050 A1 | 5/2022 | Martinez |
| 2022/0256429 A1 | 8/2022 | Martinez |
| 2023/0003836 A1 | 1/2023 | Martinez |

FOREIGN PATENT DOCUMENTS

| | | |
|---|---|---|
| WO | WO 2016/187458 | 11/2016 |
| WO | WO 2018/094502 | 5/2018 |
| WO | WO 2020/170221 | 8/2020 |
| WO | WO 2020/240526 | 12/2020 |
| WO | WO 2021/084519 | 5/2021 |

OTHER PUBLICATIONS

SCPL: Indoor Device-Free Multi-Subject Counting and Localization Using Radio Signal Strength; 2013; Xu et al. (Year: 2013).*

U.S. Appl. No. 17/014,720, Michel A. Martinez, Monitoring Activity Using Wi-Fi Motion Detection, Sep. 8, 2020.

U.S. Appl. No. 17/006,579, Michel A. Martinez, System and Method for Presence and Pulse Detection From Wireless Systems, Nov. 2, 2020.

PCT/IB2020/060271, System for Multi-Path 5G and Wi-Fi Motion Detection, Nov. 2, 2020.

PCT Application No. PCT/IB2020/060271 International Search Report and Written Opinion dated Feb. 15, 2021.

U.S. Appl. No. 16/796,662 Office Action dated Feb. 12, 2021.

Deng et al., "CC-DTW: An Accurate Indoor Fingerprinting Localization Using Calibrated Channel State Information and Modified Dynamic Time Warping", Sensors 19, No. 9:1984, Apr. 28, 2019 (Apr. 28, 2019), [online] [retrieved on Aug. 20, 2020 (Aug. 20, 2020)], Retrieved from the internet: https://www.mdpif.com/1424-8220/19/9/1984.

Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Feb. 8, 2017), [online] [retrieved on Aug. 20, 2020 (Aug. 20, 2020)], Retrieved from the internet: https://aaai.org/ocs/index.php/IAAI/IAAI17/paer/view/15010.

(56) References Cited

OTHER PUBLICATIONS

Rui Zhou et al., "Device-free Localization Based on CSI Fingerprints and Deep Neural Networks", 15 Annual IEEE International Conference on Sensing, Communication, and Networking (SECON), Jun. 11, 2018 (Jun. 11, 2018), [online] [retrieved on Aug. 20, 2020 (Aug. 20, 2020] Retrieved from the internet: https://dl.acm.org/doi/10.1145/2639108.2639143.
Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.
Yang Wang et al., "E-eyes: Device-free Location-oriented Activity Identification Using Fine-grained Wifi Signatures", MobiCom'14, pp. 617-628 Sep. 7, 2014 (Sep. 7, 2014), [retrieved on Aug. 20, 2020 (Aug. 20, 2020)], Retrieved from the internet: https://dl.acm.org/doi/10.1145/2639108.2639143.
PCT Application No. PCT/IB2020/055186 International Search Report and Written Opinion dated Oct. 15, 2020.
PCT/IB2020/051503, Smart Media Display, Feb. 22, 2020.
U.S. Appl. No. 16/796,662, Michel A. Martinez, Smart Media Display, filed Feb. 20, 2020.
U.S. Appl. No. 16/798,138, Small Motion Vector Identification in a Wi-Fi Motion Detection System, filed Feb. 21, 2020.
U.S. Appl. No. 16/794,668, Michel A. Martinez, Robotic H Matrix Creation, filed Feb. 19, 2020.
U.S. Appl. No. 16/798,319, Michel A. Martinez, Wi-Fi Based Condition Monitoring, filed Feb. 22, 2020.
U.S. Appl. No. 16/795,219, Michel A. Martinez, Self-Learning Based on Wi-Fi-Based Monitoring and Augmentation, filed Feb. 19, 2020.
U.S. Appl. No. 16/798,148, Seyedehsan Bateni, Wireless Motion Detection Using Multiband Filters, filed Feb. 21, 2020.
U.S. Appl. No. 17/006,579, Michel A. Martinez, System and Method for Presence and Pulse Detection From Wireless Systems, filed Aug. 28, 2020.
PCT Application No. PCT/IB2020/051503 International Preliminary Report on Patentability dated Aug. 10, 2021.
U.S. Appl. No. 16/798,148 Office Action dated Oct. 22, 2021.
PCT Application No. PCT/IB2020/051503 International Search Report and Written Opinion dated Jul. 30, 2020.
U.S. Appl. No. 16/798,138 Office Action dated Sep. 8, 2020.
PCT Application No. PCT/IB2020/055186 International Preliminary Report on Patentability dated Nov. 16, 2021.
U.S. Appl. No. 16/798,319 Office Action dated Dec. 29, 2021.
U.S. Appl. No. 17/006,579 Office Action dated Jan. 6, 2022.
U.S. Appl. No. 16/798,148 Final Office Action dated Apr. 8, 2022.
U.S. Appl. No. 17/131,078 Non-Final Office Action dated Mar. 2, 2022.
PCT Application No. PCT/IB2020/060271 International Preliminary Report on Patentability dated May 3, 2022.
U.S. Appl. No. 16/794,668 Office Action dated May 24, 2022.
U.S. Appl. No. 16/798,319 Final Office Action dated Jun. 13, 2022.
U.S. Appl. No. 16/798,148 Office Action dated Jul. 26, 2022.
U.S. Appl. No. 16/798,148, Final Office Action, dated Jan. 3, 2023.

\* cited by examiner

| Time Stamp | Party Size | Engaged Party Size | Indiv. 1's Engagement Score | Indiv. 2's Engagement Score | Indiv. 3's Engagement Score | ... | Indiv. N's Engagement Score | Ad Slot Y/N | Ad Played |
|---|---|---|---|---|---|---|---|---|---|
| 0800 | 2 | 1 | 10 | 4 | N/A | ... | N/A | N | |
| 0801 | 2 | 1 | 10 | 4 | N/A | ... | N/A | N | |
| 0802 | 2 | 1 | 10 | 4 | N/A | ... | N/A | Y | Pillow.vid |
| 0803 | 1 | 1 | 10 | N/A | N/A | ... | N/A | Y | Pillow.vid |
| 0804 | 1 | 1 | 9 | N/A | N/A | ... | N/A | N | |
| ... | ... | ... | ... | ... | ... | ... | ... | | |
| 1200 | 3 | 3 | 6 | 8 | 8 | ... | N/A | N | |

FIG. 5

| Advertisement | Minimum Average Engagement Score | Party Size | Flag |
|---|---|---|---|
| Blender.vid | 5 | Small | Positive x2 |
| Sheets.vid | 8 | Single/Small | Positive x4 |
| Travel.vid | 6 | Small/Group | Negative x7 |
| Toilet Paper.vid | 5 | Single/Group | Positive x3 |
| ... | ... | ... | ... |
| Pillow.vid | 6 | Single/Small | Negative x1 |

FIG. 6

ADVERTISEMENT ENGAGEMENT MEASUREMENT

CROSS-REFERENCE TO RELATED APPLICATIONS

The present application claims the priority benefit of U.S. Provisional Patent Application No. 62/809,011, filed on Feb. 22, 2019 and entitled "Knowledge-Based Feature Fusion for Robust Device-Free Localization and Activity Monitoring" and U.S. Provisional Patent Application No. 62/809,336, filed on Feb. 22, 2019 and entitled "Advertisement Engagement Measurement," the contents of which are incorporated herein by reference in their entirety.

BACKGROUND OF THE INVENTION

1. Field of the Invention

The present disclosure is generally related to targeted advertising, smart televisions, and passive motion detection systems.

2. Description of the Related Art

Targeted advertising is a form of advertising where online advertisers can use sophisticated methods to target the most receptive portions of an audience based on certain specified traits of interest, which may be identified as indicative of being receptive to the advertised product or service. Through the emergence of new online channels, the need for targeted advertising is increasing because companies aim to minimize wasted advertising by means of information technology. Most targeted new media advertising currently uses second-order proxies for targeting, such as tracking online or mobile web activities of consumers, associating historical web page consumer demographics with new consumer web page access, using a search word as the basis for implied interest, or contextual advertising.

It is desirable to have an integrated means of knowing how many individuals are watching media and advertising content, while also determining if, and to what level, each of those individuals is engaged with the content, without connecting to any devices associated with the viewers.

SUMMARY OF THE CLAIMED INVENTION

Systems, and methods for selecting advertisements based on party size and/or engagement are provided. An Internet-connected media display device may be detected as displaying media. An up-to-date party size in a monitored space may be determined based on frequency response data by a wireless access point located close to the space. An up-to-date engagement level may also be determined with respect to each individual in the space based on frequency response data by the wireless access point. An advertisement database may be filtered for a qualifying advertisement based on the identified party size and engagement levels.

BRIEF DESCRIPTION OF THE FIGURES

FIG. 5 illustrates an exemplary engagement database.

FIG. 6 illustrates an exemplary advertisement database.

DETAILED DESCRIPTION

Figure 1:
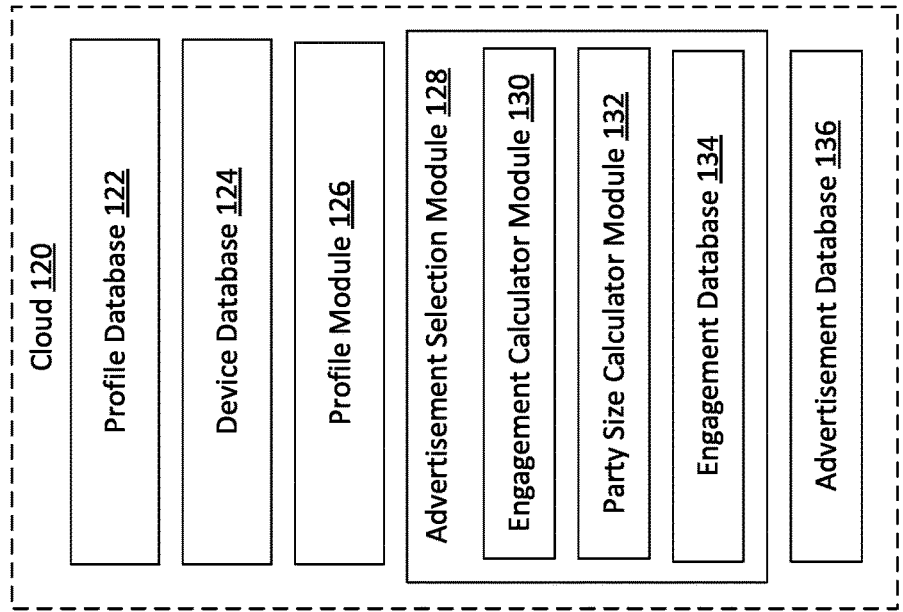
FIG. 1 illustrates an exemplary system network environment in which a system for advertisement engagement measurement may be implemented.
Figure 1:
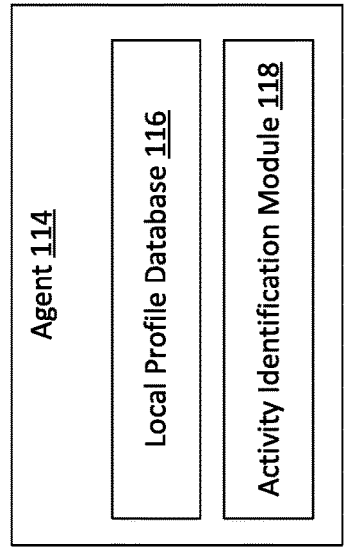
Figure 1:
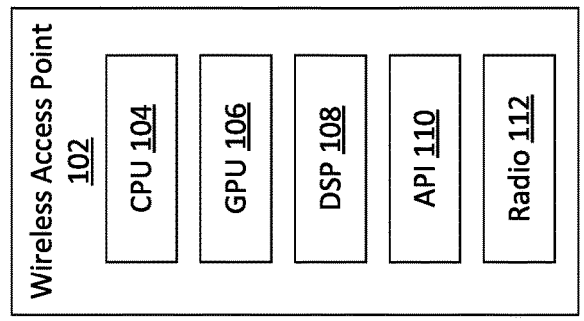

Disclosed herein are systems, methods and computer-readable storage media for selecting advertisements on a media display based on party size and/or party engagement levels. In some aspects, an exemplary method can include: detecting that an Internet-connected media display device is displaying media; determining, from a party size calculator module, an up-to-date party size of individuals in a monitored space based on an examination of frequency response data, associated with the monitored space, by a wireless access point located in proximity to the monitored space; determining, from an engagement calculator module, an up-to-date engagement level with respect to each of the individuals in the monitored space based on the examination of the frequency response data by the wireless access point; filtering an advertisement database for a qualifying advertisement, for a suitable advertisement slot, that matches the up-to-date party size, an average of the up-to-date engagement levels between the individuals in the monitored space. In some examples, if there are two or more advertisements that qualify then the filtering takes into account a flag count of each of the two or more advertisements. The qualifying advertisement may have the highest flag count as determined by whether a first engagement level changes with respect to a second engagement level of a previous timestamp during playtime of an associated advertisement.

Methods may further include: updating the advertisement database with respect to flag counts, determining that a first party size is different than a second party size of a previous timestamp; decreasing an associated flag count for an associated advertisement when the first party size is less than the second party size; and increasing the associated flag count for the associated advertisement when the first party size is greater than the second party size. Further embodiments may further include: updating the advertisement database with respect to flag counts, as well as include determining a first engaged party size is different than a second engaged party size of the previous timestamp; decreasing an associated flag count for an associated advertisement when the first engaged party size is less than the second engaged party size; and increasing the associated flag count for the associated advertisement when the first engaged party size is greater than or equal to the second engaged party size.

Embodiments may further include: updating the advertisement database with respect to flag counts, determining a first average engagement level of the first party is different than a second average engagement level of the second party of the previous timestamp; decreasing an associated flag count for an associated advertisement when the first average engagement level is less than the second average engagement level; and increasing the associated flag count for the associated advertisement when the first average engagement level is greater than the second average engagement level.

In some examples, the first and second average engagement levels may be retrieved from an engagement database including engagement levels of each party member that was monitored at interval timestamps in the monitored space. The frequency response data may be associated with a radio map using Wi-Fi localization to translate Wi-Fi signal strengths into locations. The radio map may further include metadata including frequency data of a channel, phase response data of the channel, and impulse response data of the channel that describe a wireless communication link between paired devices used to compare with a signal scan. In some examples, one or more cloud databases may include the engagement calculator module, party size calculator module, and advertisement database.

In some aspects, an exemplary system can include one or more processors and a non-transitory computer-readable storage medium having stored therein instructions which, when executed by the one or more processors, cause the one or more processors to perform the steps described herein.

The technologies herein can provide advertisement engagement measurements based upon a device-free indoor positioning technology that can locate and measure engagement of individuals in a monitored space based on passively observing changes in the environment. Such changes would be determined based on comparisons of locations of interests that have built an ensemble of fingerprints during a training phase. During a testing phase, fingerprints generated from new data would be compared with those from the training phase to determine a location of a individual. The differences between the fingerprints generated from the new data and those from the training phase would result in data indicating position and engagement of movement that would reflect where and how much an individual is engaged with respect to watching a media device, such as a smart TV, in the monitored space. The number of individuals and the level of engagement of the individuals in the monitored space are used to determine what advertisements should be played based on what certain requirements associated with the advertisements, such as a minimum average engagement score or party size.

Figure 2:
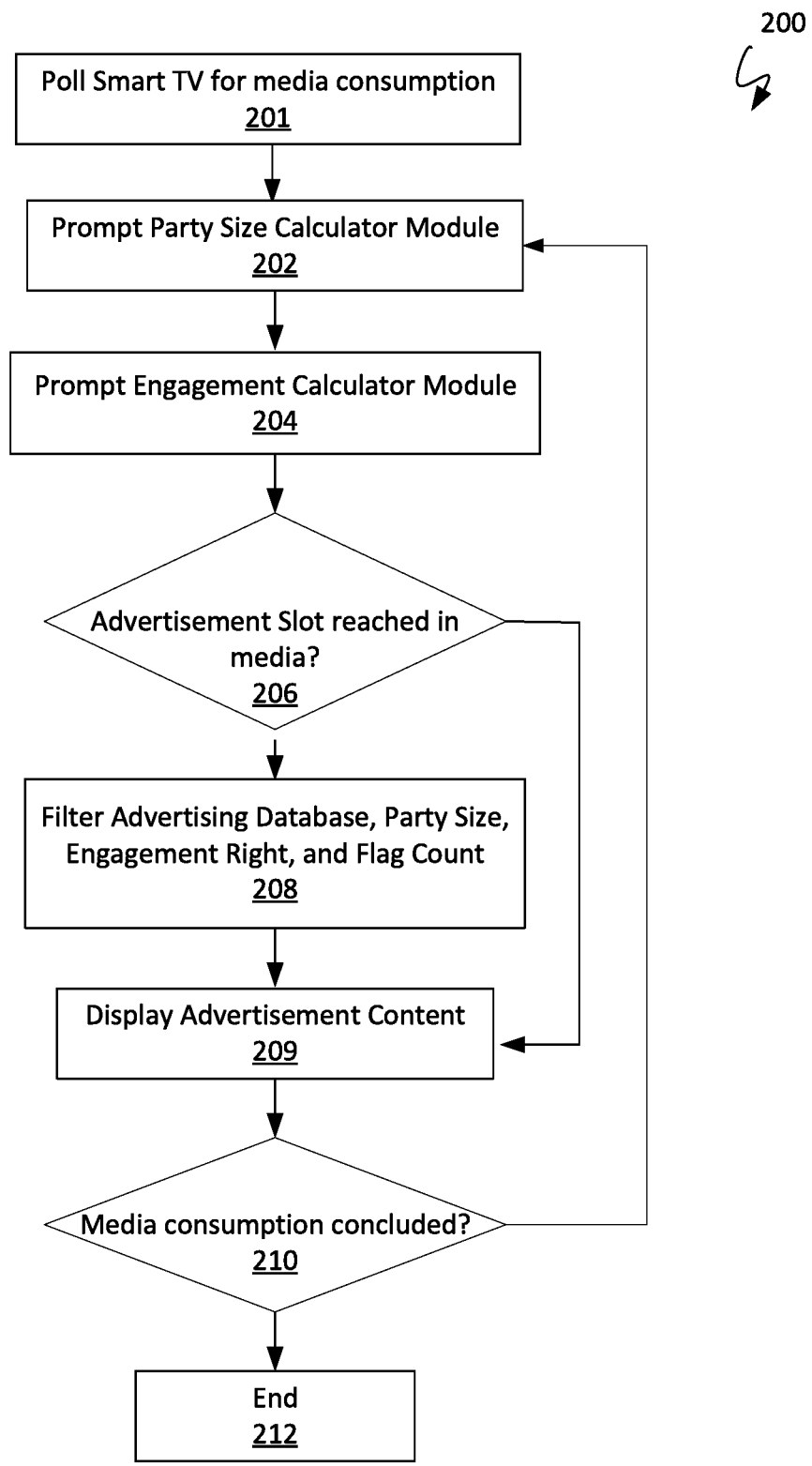
FIG. 2 is a flowchart illustrates an exemplary method of advertisement selection.
Figure 3:
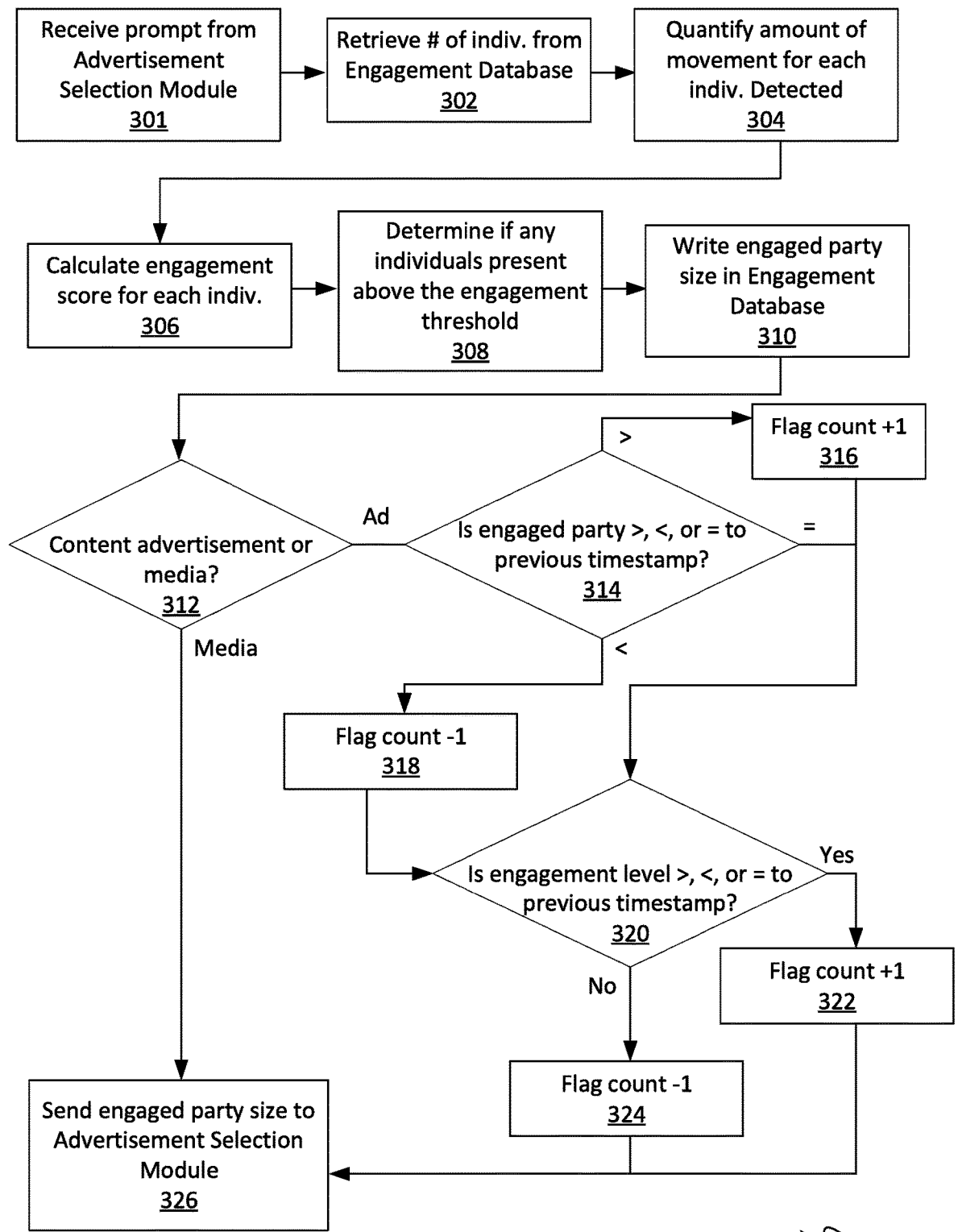
FIG. 3 is a flowchart illustrates an exemplary method of determining engagement levels.
Figure 4:
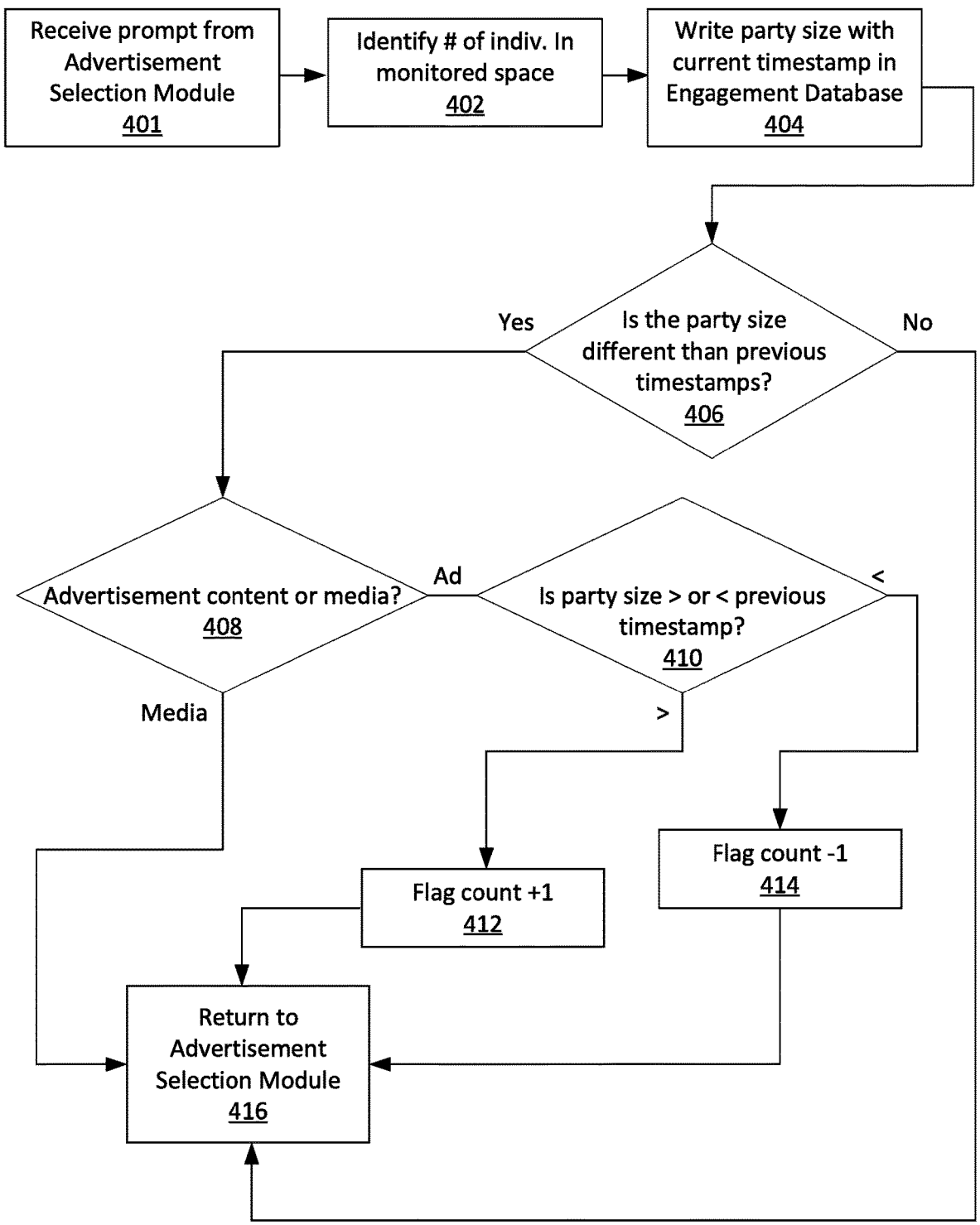
FIG. 4 is a flowchart illustrates an exemplary method of determining party size.

The approaches herein can provide systems, methods, and computer-readable storage media for determining party size with respect to the number of individuals in the monitored space, the respective level of engagement of those individuals, and which advertisement to play given the party size and level of engagement, where the party size and level of engagement is determined by passive indoor positioning technology using channel state information (CSI). The disclosure begins with an initial discussion of systems and technologies for determining party size and level of engagement through the passive indoor positioning technology using CSI, as generally exemplified in FIG. 1. In FIGS. 2 through 4, example flows illustrate how to determine party size and level of engagement and selecting an advertisement based on the party size and level of engagement. In FIGS. 5 and 6, example tables illustrate an engagement database and an advertisement database, respectively. The disclosure now turns to an overview regarding the wireless communication technology for location-based services for determining the party size and level of engagement in the present technology for selecting a suitable advertisement.

FIG. 1 illustrates an exemplary network environment in which a system for advertisement engagement measurement may be implemented. The exemplary network environment 100 may be used to provide device-free localization and activity monitoring in a defined environment or space and to use machine learning algorithms to learn and recognize various kinds of activities. The exemplary network environment 100 may include a Wi-Fi access point (AP) 102, agent 114, smart TV 138, and cloud server 120.

Wi-Fi AP 102 may be configured to record channel state information (CSI). In Wi-Fi communications, CSI refers to known channel properties of a radio frequency (RF) communication link that describes how a signal propagates from a transmitter to a receiver and represents a combined effect of various properties such as channel frequency response, channel phase response, and/or channel impulse response. Wi-Fi AP 102 may include central processing unit (CPU), graphics processing unit (GPU) 106, digital signal processor (DSP) 108, application program interface (API) 110, and radio 112.

CPU 104 may carry out instructions for the Wi-Fi AP 102 to perform. GPU 106 may be a specialized electronic circuit designed to rapidly manipulate and alter memory to accelerate the creation of images in a frame buffer intended for output to a display device. Digital signal processor (DSP) 108 may be a specialized microprocessor, or a system-in-a-package (SiP) component, with its architecture optimized for the operational needs of digital signal processing. The DSP 108 may be configured to measure, filter, or compress continuous real-world analog signals. API 110 may be a set of routines, protocols, and tools for building software applications, programming any graphical user interface (GUI) components, and specifying how software components interact. The API 110 may provide metadata related to the CSI to an agent 114.

The Wi-Fi AP 102 may further include a radio 112 that may be compliant with IEEE 802.11 standards such as 802.11b or 802.11g, using omnidirectional antenna, and may have a range of 100 m (0.062 mi). The radio 112 may have an external semi-parabolic antenna (15 dB gain) with a similarly equipped receiver at the far end might have a range over 20 miles. The Wi-Fi AP 102 may be equipped with a network interface card (NIC) that connects the Wi-Fi AP 102 to a computer network. The radio 112 may be a transceiver, a transmitter, or a receiver.

The agent 114 may collect CSI-related metadata from the Wi-Fi AP 102, filter the CSI-related metadata, and send the filtered CSI-related metadata to one or more cloud databases 120 for activity identification. The activity identification can be accomplished on an edge, at an agent level, or in the cloud, or some combination of the three. The agent 114 may include a local profile database 116 that is utilized when at least a portion of the activity identification is done on the edge. This could be a simple motion versus no-motion determination profile database or a more extensive profile database used for identifying activities, objects, individuals, biometrics, etc.

The agent 114 may also include an activity identification module 118 that distinguishes between activities, such as between walking and in-place activities. In general, a walking activity may cause significant pattern changes to amplitude over time of the channel impulse response, since it involves significant body movements and location changes. In contrast, an in-place activity (such as watching TV on a sofa) may only involve relatively smaller body movements and may not cause significant pattern changes to amplitude over time of the channel impulse response. Advertisement in-place activity is reflected by certain repetitive patterns within the channel impulse response.

Cloud server 120 may include or otherwise have access to a profile database 122, device database 124, profile module 126, advertisement selection module 128, engagement calculator module 130, party size calculator module 132, engagement database 134, and advertisement database 135. Such databases and module 122-136 associated with cloud server 120 may be used to create, modify, analyze, and store profiles describing various activities by users in a monitored space.

Profile module 126 may monitor the received CSI-related metadata from a continuous monitoring of a monitored space, identify multiple similar patterns of a set of CSI-related metadata that do not have a matching profile in a profile database 122, combine the set of CSI-related metadata with user feedback to label the resulting clusters, and define a new profile that may then be added to the profile database 122. The profiles in the profile database 122 may be profiles characterizing simple motion versus no-motion determinations, as well as more extensive descriptive profiles that may be sued to detect and characterize different types of activities, objects, individuals, biometrics, etc. Device database 124 may store device ID of all connected wireless APs.

The cloud server 120 may further include an advertisement selection module 128, which utilizes engagement scores provided by an engagement calculator module 130 to determine if one or more individuals in the monitored space are engaged with a smart TV 138 displaying media content or advertising content. Advertisement selection module 128 may determine which advertisement content to display in an advertisement slot. When there is a marked drop in engagement related to specific advertising content, similar advertising content may be marked with a negative flag count as an indication of lesser interest in the advertising content. Therefore, the advertisement selection module 128 can learn a pattern of interest to maximize engagement with advertising content and ensure advertisers receive maximum return on investment. An exemplary process of the advertisement selection module 128 is further described in FIG. 2.

The engagement calculator module 130 measures an engagement level of the individuals in the monitored space as a function of how much motion is detected. Each individual's movement level may be quantified in various ways, for example, from 0 to 1, with 0 being asleep and 1 being an athletic activity. A viewer sitting awake and watching the TV may have a movement score of 0.1, which may translate to an engagement score of 10. The localization information related to the motion data can, in some examples, be used to help quantify the level of engagement motion.

For example, motion far from the smart TV 138 may indicate that an individual is not as engaged in comparison to if the individual were closer to the smart TV 138. The individual abandoning the monitored space could be an indication of the individual is no longer engaged. Motion within the monitored space may have a lower movement score than movement that is towards the exit of the room. Additionally, motion could be viewed cumulatively, so that if the individual is moving from one seat in the living room to another while watching the smart TV 138, that may be viewed as more engagement as opposed to the user moving back and forth more consistently, indicating they are engaged in another activity.

For example, when an individual's motion level is greater than 0.5, they are considered too active to be engaged in the advertising content or media content displayed on the smart TV 138. The engagement calculator module 130 monitors for changes in engagement level, and when those changes coincide with advertising content, positive or negative flags are applied to that advertisement content or advertisement type in an advertising database 136 of the one or more cloud databases 120, for the purposes of targeting viewers with advertisements that have the highest positive flag count. An exemplary process of the engagement calculator module 130 is illustrated described in FIG. 3. An exemplary process of the party size calculator module is further illustrated in FIG. 4.

For example, a room with two individuals but only one engaged individual, would be shown advertisements for a single audience and not those for a small collection of people, or groups of four or more. A second filter may be for a minimum average engagement level of viewers the advertiser paid for. A third filer, may be applied when there are still multiple advertisements that meet the first two filters, is the positive flag count. Each time engagement or party size decreases, the engagement calculator module 130 and party size calculator module 132 may apply a negative flag to the advertisement content or advertisement type.

The one or more cloud databases 120 may further include a party size calculator module 132 that quantifies the number of individuals in the room, applies positive and negative flags to an advertisement content or advertisement type in the advertising database 136 based on increases or decreases in the number of individuals in the room when the advertisement content is being displayed. The one or more cloud databases 120 may further include an engagement database 134 that stores, with every interval timestamp, an associated party size and engagement level in the room being monitored, as calculated by the party size calculator module 132 and the engagement calculator module 130. The engagement database 134 is further described below along with an exemplary engagement database table shown in FIG. 5.

With respect to the advertisement database 136, it contains video files, links to video files, or file names associates with the video files of each advertisement to be delivered to the smart TV 138, the relevant locations, such as kitchen, the rating, corresponding to the amount paid, and the user engagement level, also based on the amount paid. The smart TV 138 is delivered the chosen advertising content to be displayed based on instructions from the one or more cloud databases 120. The advertisement database 136 is further described below along with an exemplary advertisement database table shown in FIG. 6.

FIG. 2 is a flowchart illustrates an exemplary method of advertisement selection. Method 200 may result from execution of the advertisement selection module 128 and may begin with polling the smart TV 138 for media consumption at step 201. The party size calculator module 132 may be prompted at step 202. The engagement calculator module 130 may be prompted at step 204. It may be determined if an advertisement slot has been reached in the media at step 206. In step 208, the advertising content available for display from the advertising database 136 may be filtered based on party size, average engagement level and positive flag count. The engaged party size, as determined by the engagement calculator module 130 and stored in the engagement database 134, may be compared to the party size(s) listed in the advertising database 136.

If the engagement level remains the same (indicating that the advertising content didn't cause an engaged viewer to disengage) or increases, or the part size increases, the engagement calculator module 130 and party size calculator module 132 each apply a positive flag, respectively, with respect to a respective advertising content. The total of the flags represents how positively or negatively the viewers have responded to the advertisement content or advertisement types. Once all filters have been made to the engagement database 134, the highest rated remaining advertisement content is played at step 208. The advertisement content may be displayed at step 209. It may be determined if the media consumption on the smart TV 138 is concluded in step 210, indicating the user is no longer watching. If the media consumption has concluded the program ends in step 212, if not, the method may loop back to calculating the party size at step 222.

FIG. 3 is a flowchart illustrates an exemplary method 300 of determining engagement levels. Method 300 may result from execution of the engagement calculator module 130 and may begin with receiving a prompt from the advertisement selection module 128 to calculate the engagement score for the monitored space at step 301. The number of individuals in the monitored space may be retrieved from the engagement database 134 at step 302. The amount of movement for each individual detected may be quantified in step 304. The amount of movement being quantified into a movement level can be between 0 and 1, with zero being asleep and one being an individual engaged in an athletic activity. For example, a first individual may be seated on the couch. This may be considered the most engaged a viewer can be and corresponds to a movement level of 0.1. The assumption being made is that the more a viewer is moving around the less engaged they are with the media or advertisement content. In the same example, an individual two may be vacuuming the room. This may corresponds to a movement level of 0.6.

The engagement score for each individual in the room may be calculated in step 306. The engagement score may be 1 over the movement level, which may result in a scale for the engagement level of each individual to range from 0 to 10, for example. With 0 representing a viewer that is asleep, 1 representing a user involved in an athletic activity and 10 representing a user who is seated and watching the smart TV 138. It may be determining if any of the individuals observed are above a movement level threshold used to determine that a viewer is not engaged with the media or advertisement content in step 308.

In an example, the party size calculator module 132 determined there were two individuals in the room with the smart TV 138. Individual one may have an engagement score of 10 and individual two may have an engagement score of 4, and an engagement score threshold of 5 may be chosen as the line below which a viewer is considered too active to be engaged in the media or advertisement content. The total number on individuals who are below the movement level threshold may be written to the engaged party size field of the engagement database 134 at step 310. It may be determining if the content being displayed on the smart TV 138 is advertisement content or media content at step 312. If it is media content the module jumps to step 326 as steps 314-324 are for the rating of advertisement content based on the change.

It may be determine if the engaged party size is greater than, less than, or equal to the engaged party size at the previous timestamp at step 314. If the engaged party size is equal to the previous timestamp, no action is taken, and the advertisement selection module 128 moves to step 320. If the engaged party size is greater than the previous timestamp, the flag column corresponding to the advertising content being played is increased by one at step 316. This provides feedback to advertisers about party sizes viewing their advertisements increasing during the viewing period. If the engaged party size in less than the previous timestamp, the flag column corresponding to the advertisement being played in decreased by 1 at step 318. A viewer leaving the room may be interpreted as negative feedback on the advertisement being displayed.

The engagement level for each individual may be compared to the engagement level for the same individual at the previous timestamp at step 320. For each individual whose engagement level is greater than or equal to their engagement level at the previous timestamp, increase the flag, count for the advertisement being displayed by 1. An increase in engagement is clearly positive feedback about the advertisement or advertisement type and would be used to inform targeted advertising choices. In some examples, we interpret an engaged viewer having no decrease in their engagement level when shown advertisement content, as opposed to media content they chose to watch, it is interpreted as positive feedback on the advertisement content or advertisement type at step 322. For each individual whose engagement level is less than their engagement level at the previous timestamp, the flag count may be decreased for the advertisement content being displayed by 1 at step 324. This balances positive and negative feedback on advertisement types and the combination of all of these flags gives an overall positive or negative ranking for an advertisement content or advertisement type. The engagement party size may then be sent to the advertisement selection module 128 at step 326.

FIG. 4 is a flowchart illustrates an exemplary method 400 of determining party size. Method 400 may result from execution of the party size calculator module 132 in accordance with some implementations. The method 400 may begin with receiving a prompt from the advertisement selection module 128 to calculate the engagement score for the room in with the smart TV 138 being monitored has media being played at step 401. The number of individuals in the space may be identified through an examination of the frequency response data provided by the wireless access point at step 402. The number of individuals identified in the space may be written to the party size field of the engagement database 134 at step 404. It may be determined if the party size is different than the previous timestamp at 406. If the party size is the same, the party size calculator module 132 skips to step 416. If the party size is different than the previous timestamp, it may be determined if the content on the smart TV 138 currently is advertisement content or media content at step 408. If the content is media content, defined as content the viewer has chosen, the party size calculator module 132 skips to step 416. If the content is advertisement content, it may be determined if the party size is greater than or less than the previous timestamp at step 410. If the party size is greater than the previous timestamp, the flag count corresponding to the displayed advertisement or advertisement type in the advertisement database 136 may be increased at step 412. If the party size is less than the previous timestamp, the flag count corresponding to the displayed advertisement or advertisement type in the advertisement database 136 may be decreased at step 414. The method 400 may return to the advertisement selection module 128 at step 416.

FIG. 5 illustrates an exemplary engagement database (e.g., engagement database 134). The engagement database 134 may contain the party size and engagement level in the room being monitored, as calculated by the party size calculator module 132 and the engagement calculator module 130. The party size calculator module 132 may determine the number of individuals in the room at the time stamp being examined and record that total as the party size. The engagement calculator module 130 may utilize the level of movement of each individual detected by the party size calculator module 132 in order to assign an engagement level to each individual. The engagement database 134 may further record if there was advertisement content being displayed at the timestamp being examined and what advertisement or type of advertisement was being displayed.

FIG. 6 illustrates an exemplary advertisement database (e.g., advertisement database 136). The advertisement database 136 may contain data associated with advertisement content, video files of those advertisement content, and/or classification data related to targeted advertisements that can be delivered to the user through their smart TV 138 through this system. The advertisement rate charged to the advertisers is a function of both the engagement score and the engaged party size. Advertisers may pay a premium to ensure their advertisements are seen by engaged viewers, and a higher premium still if they want their advertisements seen by a certain size audience. Different advertisements may be better suited to different size groups of people as opposed to just paying more to be seen by more engaged viewers. In this embodiment party sizes are divided into three groups, small collections of people (2-4 people), single viewers or groups (4 or more). The first column of the database contains the advertisement content. The second the minimum average engagement score of viewers the advertisement is to be displayed for. The third the party size the advertisement is intended for. The final column is the total number of flags the advertisement (or advertisement type in other embodiments) assigned to the advertisement by either the party size module or the engagement calculator.

For clarity of explanation, in some instances the present technology may be presented as including individual functional blocks including functional blocks including devices, device components, steps or routines in a method embodied in software, or combinations of hardware and software. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example. The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for engagement-based targeting, the method comprising:
    detecting that an Internet-connected media display device in a monitored space is displaying media, wherein the monitored space is in proximity to a wireless access point;
    generating a radio map based on Wi-Fi signal strengths associated with a plurality of locations within the monitored space, wherein the radio map comprises metadata regarding at least one of frequency data of a channel, phase response data of the channel, and impulse response data of the channel that describe a wireless communication link between paired devices used to compare with a signal scan;
    determining an up-to-date size of a party of individuals in the monitored space and an up-to-date engagement level of each of the individuals based on an examination of the radio map corresponding to frequency response data associated with the monitored space by the wireless access point; and
    filtering a plurality of content files available from a content file database for a qualifying content file to be displayed at the Internet-connected media display device, wherein filtering the plurality of content files is based on the up-to-date party size and an average of the up-to-date engagement levels among the individuals in the monitored space.

2. The method of claim 1, further comprising:
    determining that two or more advertisements preliminarily qualify as the qualifying content file;
    determining a flag count for each of the two or more advertisements based on a first engagement level change relative to a second engagement level at a previous timestamp, wherein filtering the content files is further based on the flag count of each of the two or more advertisements;
    selecting the qualifying content file associated with a highest flag count; and
    updating the content file database to include the flag counts.

3. The method of claim 2, wherein determining the flag count for each of the two or more advertisements comprises:
    determining that a first party size is different than a second party size of the previous timestamp; and
    adjusting a current flag count of the respective advertisement based on a comparison of the first party size to the second party size, wherein the current flag count is decreased when the first party size is less than the second party size, and wherein the current flag count is increased when the first party size is greater than the second party size.

4. The method of claim 2, wherein determining the flag count for each of the two or more advertisements comprises:
determining that a first engaged party size is different than a second engaged party size of the previous timestamp; and
adjusting a current flag count of the respective advertisement based on a comparison of the first engaged party size to the second engaged party size, wherein the current flag count is decreased when the first engaged party size is less than the second engaged party size, and wherein the current flag count is increased when the first engaged party size is greater than or equal to the second engaged party size.

5. The method of claim 2, wherein determining the flag count for each of the two or more advertisements comprises:
determining a first average engagement level of a first party is different than a second average engagement level of a second party of the previous timestamp; and
adjusting a current flag count of the respective advertisement based on a comparison of the first average engagement level to the second average engagement level, wherein the current flag count is decreased when the first average engagement level is less than the second average engagement level, and wherein the current flag count is increased when the first average engagement level is greater than the second average engagement level.

6. The method of claim 5, further comprising retrieving the first and second average engagement levels from an engagement database that stores engagement levels of each of the individuals in the party, each engagement level taken at an interval and associated with a timestamp.

7. The method of claim 1, further comprising storing the engagement level in an engagement database in memory.

8. A non-transitory, computer-readable storage medium having embodied thereon instructions executable by one or more processors to perform method for engagement-based targeting, the method comprising:
detecting that an Internet-connected media display device in a monitored space is displaying media, wherein the monitored space is in proximity to a wireless access point; generating a radio map based on Wi-Fi signal strengths associated with a plurality of locations within the monitored space, wherein the radio map comprises metadata regarding at least one of frequency data of a channel, phase response data of the channel, and impulse response data of the channel that describe a wireless communication link between paired devices used to compare with a signal scan;
determining an up-to-date size of a party of individuals in the monitored space and an up-to-date engagement level of each of the individuals based on an examination of the radio map corresponding to frequency response data associated with the monitored space by the wireless access point; and
filtering a plurality of content files available from a content file database for a qualifying content file to be displayed at the Internet-connected media display device, wherein filtering the plurality of content files is based on the up-to-date party size and an average of the up-to-date engagement levels among the individuals in the monitored space.

9. The non-transitory computer-readable storage medium of claim 8, further comprising instructions executable to:
determine that two or more advertisements preliminarily qualify as the qualifying content file;
determine a flag count for each of the two or more advertisements based on a first engagement level change relative to a second engagement level at a previous timestamp, wherein filtering the content files is further based on the flag count of each of the two or more advertisements;
select the qualifying content file associated with a highest flag count; and
update the content file database to include the flag counts.

10. The non-transitory computer-readable storage medium of claim 9, wherein determining the flag count for each of the two or more advertisements comprises:
determining that a first party size is different than a second party size of the previous timestamp; and
adjusting a current flag count of the respective advertisement based on a comparison of the first party size to the second party size, wherein the current flag count is decreased when the first party size is less than the second party size, and wherein the current flag count is increased when the first party size is greater than the second party size.

11. The non-transitory computer-readable storage medium of claim 9, wherein determining the flag count for each of the two or more advertisements comprises:
determining that a first engaged party size is different than a second engaged party size of the previous timestamp; and
adjusting a current flag count of the respective advertisement based on a comparison of the first engaged party size to the second engaged party size, wherein the current flag count is decreased when the first engaged party size is less than the second engaged party size, and wherein the current flag count is increased when the first engaged party size is greater than or equal to the second engaged party size.

12. The non-transitory computer-readable storage medium of claim 9, wherein determining the flag count for each of the two or more advertisements comprises:
determining a first average engagement level of a first party is different than a second average engagement level of a second party of the previous timestamp; and
adjusting a current flag count of the respective advertisement based on a comparison of the first average engaged level to the second average engagement level, wherein the current flag count is decreased when the first average engagement level is less than the second average engagement level, and wherein the current flag count is increased when the first average engagement level is greater than the second average engagement level.

13. The non-transitory computer-readable storage medium of claim 12, further comprising instructions executable to retrieve the first and second average engagement levels from an engagement database that stores engagement levels of each of the individuals in the party, each engagement level taken at an interval and associated with a timestamp.

14. A system for engagement-based targeting, the system comprising:
a wireless access point located in proximity to a monitored space; and
a cloud server that:
detects that an Internet-connected media display device in the monitored space is displaying media;

generates a radio map based on Wi-Fi signal strengths associated with a plurality of locations within the monitored space, and wherein the radio map further comprises metadata regarding at least one of frequency data of a channel, phase response data of the channel, and impulse response data of the channel that describe a wireless communication link between paired devices used to compare with a signal scan;

determines an up-to-date size of a party of individuals in the monitored space and an up-to-date engagement level of each of the individuals based on an examination of the radio map corresponding to frequency response data associated with the monitored space by the wireless access point; and filters a plurality of content files available from a content file database for a qualifying content file to be displayed at the Internet-connected media display device, wherein filtering the plurality of content files is based on the up-to-date party size and an average of the up-to-date engagement levels among the individuals in the monitored space.

15. The system of claim 14, wherein the cloud server further:

determines that two or more advertisements preliminarily qualify as the qualifying content file;

determines a flag count for each of the two or more advertisements based on a first engagement level change relative to a second engagement level at a previous timestamp, wherein filtering the content files is further based on the flag count of each of the two or more advertisements;

selects the qualifying content file associated with a highest flag count; and updates the content file database to include the flag counts.

* * * * *